Jan. 21, 1930.  T. MIDGLEY  1,744,484
CORE SUPPORT
Filed Dec. 14, 1922   3 Sheets-Sheet 1
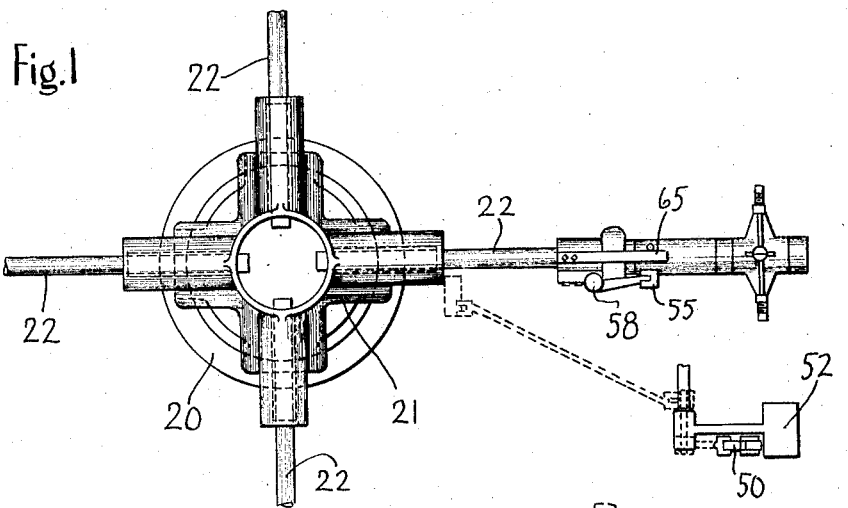
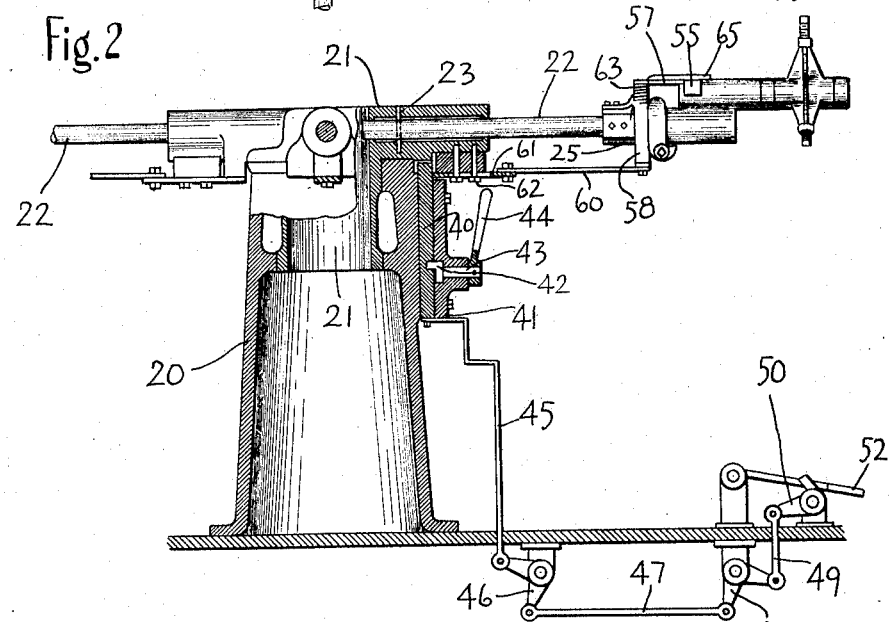
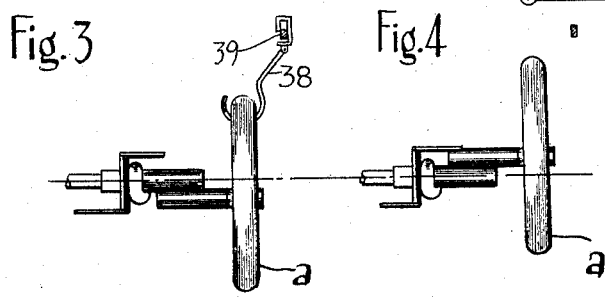
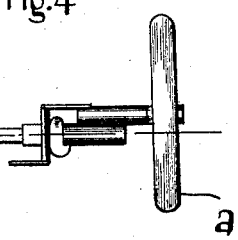
INVENTOR
Thomas Midgley
BY
ATTORNEY Jan. 21, 1930.  T. MIDGLEY  1,744,484
CORE SUPPORT
Filed Dec. 14, 1922  3 Sheets-Sheet 2

INVENTOR
Thomas Midgley
BY
ATTORNEY

Jan. 21, 1930.　　T. MIDGLEY　　1,744,484
CORE SUPPORT
Filed Dec. 14, 1922　　3 Sheets-Sheet 3
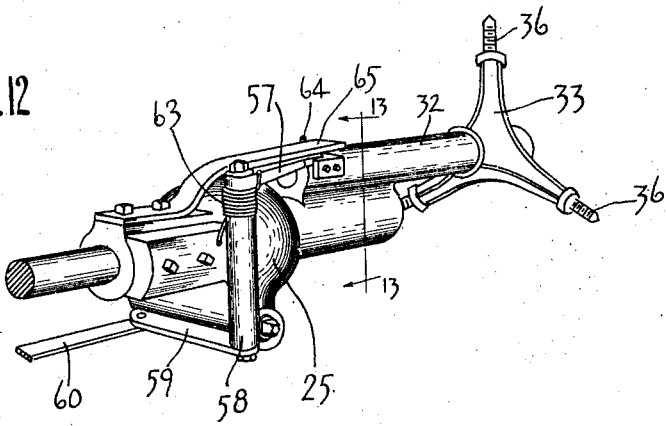
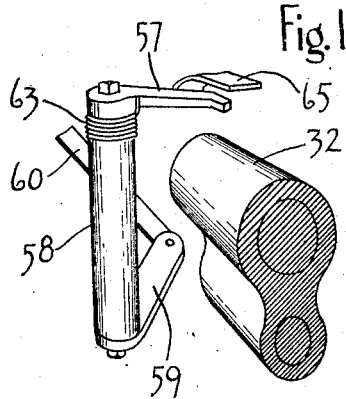
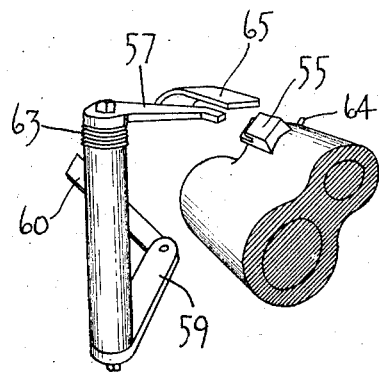
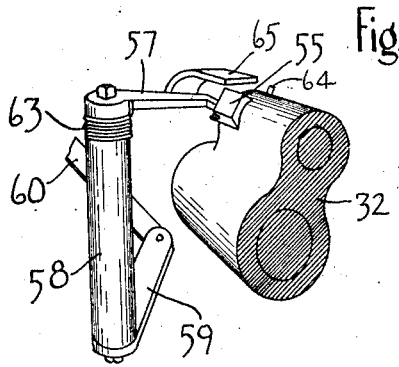
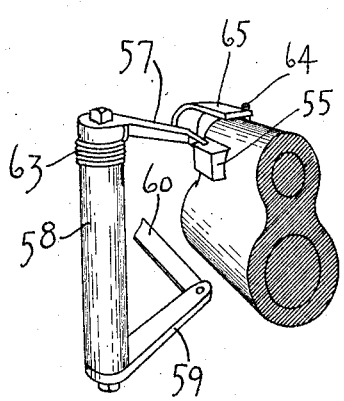
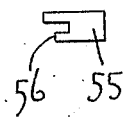
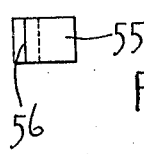
INVENTOR
Thomas Midgley
BY
ATTORNEY Patented Jan. 21, 1930

1,744,484

UNITED STATES PATENT OFFICE

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS

CORE SUPPORT

Application filed December 14, 1922. Serial No. 606,907.

The present invention relates to a tire core support, particularly adapted for presenting the annular cores on which tire casings are formed to a machine which performs some tire building operation thereon. Among its objects may be mentioned the convenient handling of cores which are supplied on hooks upon an overhead track, the shifting of the core from an elevation suitable for receiving a core from the track to one suitable for operation upon by the building machine, and the prevention of mishaps by providing a system of interlocks whereby operation of the machine or of the core moving devices is prevented save when the several devices are in their proper relations. Other objects will appear from the following description and claims.

The invention will now be described in connection with the accompanying drawings, in which Fig. 1 is a top plan of a core handling turret embodying the invention, all but one of the core supports being shown broken away;

Fig. 2 is a side elevation thereof, partly in median section;

Figs. 3 and 4 are diagrammatic views showing the operation of removing a core from a supporting hook;

Fig. 12 is a perspective of the core supporting and elevating mechanism;

Fig. 13 is a sectional perspective, looking from the line 13—13 in Fig. 12;

Figs. 14 to 16 are similar views showing successive stages;

Fig. 17 is a top plan of a block shown in Fig. 16; and

Fig. 18 is a side elevation thereof.

Figure 5:
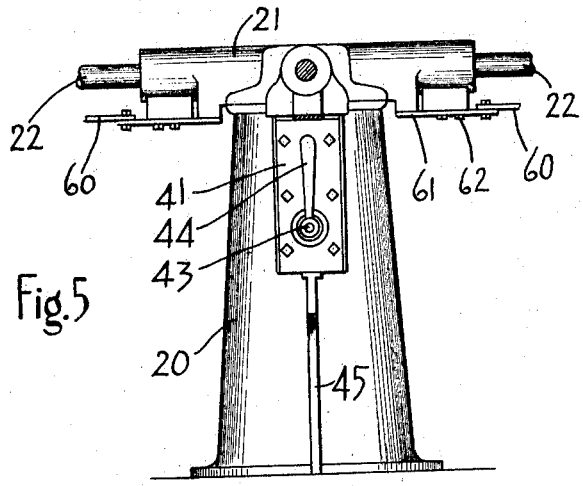
Fig. 5 is an elevation looking from the right in Fig. 2.
Figure 8:
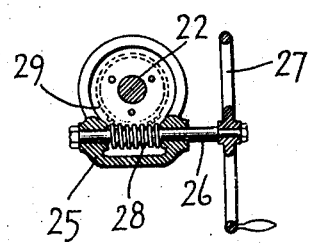
Fig. 8 is a section on line 8—8 of Fig. 7.
Figure 9:
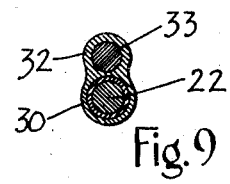
Fig. 9 is a section on line 9—9 of Fig. 7.
Figure 7:
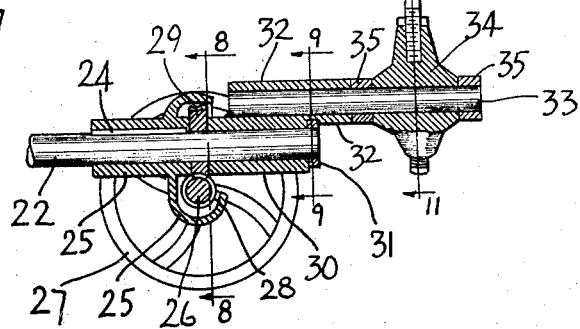
Fig. 7 is a median section of the core elevating and lowering mechanism.

The device is shown as embodied in a four armed turret mounted on a standard 20. Upon this standard is mounted a rotating head 21 upon which are carried four arms 22 fixed in position as by pins 23 (Fig. 2). A spline 24 (Fig. 7) unites to the end of each arm a housing 25, in which is journaled a cross shaft 26. This shaft (Figs. 7 and 8) carries a handwheel 27 by which it may be rotated, and a worm 28 meshing with a wormwheel 29 journaled on arm 22 and fixed to member 30 likewise so journaled. A collar 31 holds the member rotatably in place on arm 22. Member 30 has an offset portion 32 in which is fixed a shaft 33. Journaled on the end of this shaft is a core supporting spider or chuck 34, which may be rotably held in place between collars 35. In the form shown, which may be replaced by any standard or desired form of chuck, the core is held by three arms 36 which slide in the body of the chuck and bear upon the inner periphery of the core, being pushed out against the core by nuts 37.

The device thus far described is operated as follows: The chuck is brought by rotation of turret head 21 into adjacency with a core $a$ supported, for example, on a hook 38 (Fig. 3) from an overhead track 39. At this time the offset portion 32 of the core supporting device is in its lower position, or at least somewhat depressed from its elevated position shown in Fig. 7. The elevation of track 39 is so arranged relative to the core handling device that the core can be swung over the holding arm 36. These arms are screwed outwardly to grasp the core firmly, and handwheel 27 is rotated to swing the offset portion 32 to its elevated position (Fig. 4) so as to raise the core clear of the hook. As indicated in Figs. 3 and 4 the track is preferably located somewhat outside the center line of the core supporting arms, so that as the core is raised the hook will of its own weight swing clear from the mechanism out of interference with the subsequent movement thereof. In a similar manner, in repositioning the core on the track hook, the core will release itself from the apparatus after the core holding arms are backed off.

Conveniently, the machine with which the core handling device is designed to cooperate is arranged so that the core will be presented to it when the offset portion 32 is at its highest position, so that after the core is mounted in position by screwing out the carrying arms the turret head 21 can be rotated to bring the core into proper registration with such machine. The detailed manner of operating the core handling mechanism to reposition the core upon the track hook need not be described, as it is merely the converse of the operation already considered.

That portion of the mechanism having particular reference to the coordination of the core with the machine which is to operate upon it may now be discussed. The turret base 20 is provided with a slide 40, operating in ways 41 and reciprocable vertically by an eccentric pin 42 mounted on a shaft 43, provided with a handle 44. A suitable transverse slot is provided in the slide into which the eccentric pin fits, so that by swinging the handle the slide will be reciprocated vertically in a well known manner. The top of the slide, when the latter is at its upper limit of motion, projects into suitable recesses in the under side of the head 21, so as to hold the turret against rotation when any of the cores are being operated upon. One slide serves to lock the turret in position to present to the building machine a core on any of the four arms 22.

Figure 6:
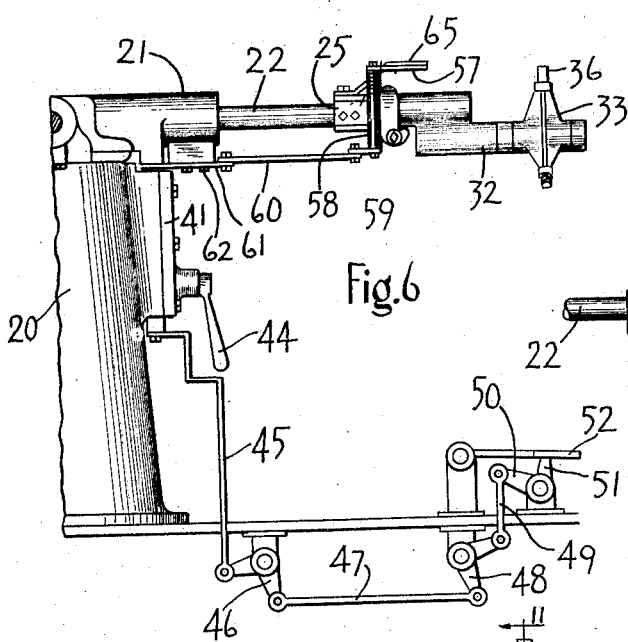
Fig. 6 is a view similar to Fig. 2, but showing the parts in full and in different positions.
Figure 10:
Fig. 10 is a top plan of the parts in the positions of Fig. 6.
Figure 11:
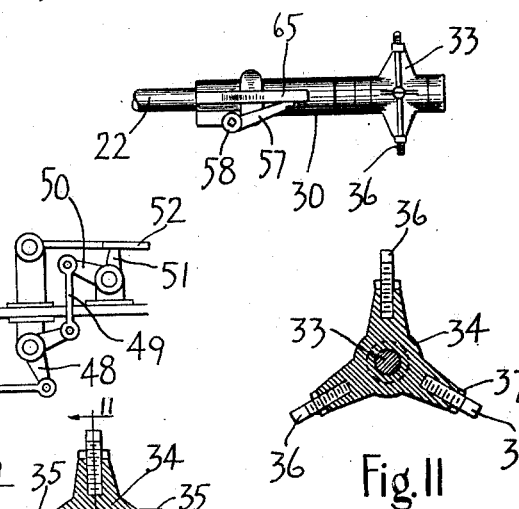
Fig. 11 is a section on line 11—11 of Fig. 7.

As a safe guard to prevent damage due to the turret not having been rotated into proper alignment with the tire building machine at the time the latter is operated, interlocking mechanism is provided to prevent the operation of the machine except when the slide 40 is elevated into locking position. For this purpose a bar 45 is attached at one end to the under side of the slide, and at its other end to one arm of a bell crank 46. A link 47 connects the other arm of crank 46 to one arm of a bell crank 48, and a link 49 connects the other arm of this latter crank with one arm of a bell crank 50. Arm 51 of crank 50 is adapted to underlie a treadle 52 (Figs. 2 and 6) forming the operating control for the tire building machine, and to prevent, when in the position of Fig. 6, the operation of the treadle. Fig. 6 represents the parts when the slide 40 is lowered to release the turret for rotation, and, as will be apparent from the figure, the treadle is securely held against operations so as to prevent inadvertent actuation of the tire building machine while the turret is not in position. When the slide is raised to lock the turret the parts will be shifted into the position of Fig. 2, in which arm 51 will be tilted sufficiently to permit depression of the treadle.

Damage might also result from actuation of the tire machine when the core head was not in its proper position of elevation, and in the drawings I have illustrated one form of interlocking mechanism for this purpose. This is shown as operable through the slide 40, by preventing the elevation of the latter when the core head is not in its position of maximum elevation. As before stated it is desirable to have the parts so proportioned that the core is in its most elevated position when the tire machine is operated, although this position may be varied if desired. In the case shown the offset portion 32 of the core head is provided with a slotted block 55 of the general proportions shown in Figs. 17 and 18, one side 56 of the slot being cut away. As the member 32 is swung upwardly (Fig. 14) the longer side of the block will contact with the end of an arm 57 carried on a vertical shaft journaled in a bearing 58 on the housing 25. Further motion of member 32 will cause the end of the arm 57 to seat in the slot (Fig. 15) until the member comes to rest in the position of Fig. 16. This motion will cause the arm 57 to rock, and this motion will be transmitted through the vertical shaft to an arm 59 attached to its lower end. A link 60 connects this arm with a slide 61 slidably secured by two bolts 62, passing through a slot in the slide and secured to the turret head 21. A spring 63 forces the arm 57 back to its normal position when the block is not in engagement with it. In order to prevent the member 32 rotating past its upright position it carries a pin 64 adapted to abut against an overhanging stop 65 carried by the housing 25.

The operation of this portion of the device will be clear from the above description. With the core carrying member 32 in its lowered position (Figs. 6 and 13) the spring 63 will hold slide 61 in place to block any attempted upward movement of slide 40. When the core carrying member has been rotated into its elevated position (Figs. 2 and 16) the engagement of block 55 with lever 57 will draw the slide 61 outwardly so as to permit the operator to raise slide 40 by the actuation of handle 44. By reason of the interconnection between the slide 40 and the treadle 52 which controls the tire building machine this arrangement just considered will serve as an interlock between the core and the tire machine to prevent operation of the latter unless the core is in its proper position of elevation.

Having thus described my invention, I claim:

1. A tire core handling device comprising a turret, a shaft projecting from the turret, an eccentric support rotatably mounted on the shaft, a core holding device carried by the eccentric support, and mechanism for rotating the eccentric support to raise or lower the core.

2. In combination, a controlling device for a tire building instrumentality, a rotatable turret for presenting a succession of tire cores to such instrumentality, means for locking the turret in position for presenting a core to such instrumentality, and mechanism controlled by the locking means for preventing the actuation of the controlling device except when the turret is locked.

3. In combination, a controlling device for a tire building instrumentality, a rotatable turret for presenting a succession of tire cores to the instrumentality, means on the turret for raising or lowering a core, means for locking the turret against rotation in position to present a core to such instrumentality, mechanism adapted to prevent locking of the turret except when the core to be presented to the instrumentality is in the correct elevated position, and mechanism for preventing actuation of the controlling device except when the turret is locked.

4. In combination, a controlling device for a tire building instrumentality, a core holder, means for raising and lowering the core holder, and mechanism for preventing the operation of the instrumentality except when the core holder is in proper elevated position.

5. In combination, a controlling device for a tire building instrumentality, a rotatable turret for presenting a succession of tire cores to the instrumentality, means on the turret for raising or lowering a core, and mechanism for preventing actuation of the controlling device except when the turret is in position to present a core to the instrumentality and unless the core so presented is in correct elevated position.

THOMAS MIDGLEY.